US010634370B2

United States Patent
Arjomand

(10) Patent No.: US 10,634,370 B2
(45) Date of Patent: Apr. 28, 2020

(54) REFRIGERATION DEVICE USES PHASE CHANGE MATERIAL FOR COOLING AIR

(71) Applicant: Ray Arjomand, Sparks, NV (US)

(72) Inventor: Ray Arjomand, Sparks, NV (US)

( * ) Notice: Subject to any disclaimer, the term of this patent is extended or adjusted under 35 U.S.C. 154(b) by 97 days.

(21) Appl. No.: 15/690,212

(22) Filed: Aug. 29, 2017

(65) Prior Publication Data

US 2019/0063765 A1  Feb. 28, 2019

(51) Int. Cl.
| | |
|---|---|
| F25B 3/00 | (2006.01) |
| F25B 11/00 | (2006.01) |
| F24F 5/00 | (2006.01) |
| F24F 1/027 | (2019.01) |
| F24F 1/04 | (2011.01) |
| F24F 1/022 | (2019.01) |
| F25D 23/12 | (2006.01) |
| F25D 16/00 | (2006.01) |
| F25D 11/00 | (2006.01) |
| F25D 3/00 | (2006.01) |
| F25D 3/02 | (2006.01) |
| F25D 3/06 | (2006.01) |

(52) U.S. Cl.
CPC ............ *F24F 5/0021* (2013.01); *F24F 1/022* (2013.01); *F24F 1/027* (2013.01); *F24F 1/04* (2013.01); *F25D 11/006* (2013.01); *F25D 16/00* (2013.01); *F25D 23/12* (2013.01); *F24F 2005/0032* (2013.01); *F25D 3/005* (2013.01); *F25D 3/02* (2013.01); *F25D 3/06* (2013.01)

(58) Field of Classification Search
CPC .......... F25D 11/006; F25D 3/00; F25D 3/005; F25D 3/02; F25D 3/04; F25D 3/045; F25D 3/06; F25D 3/08; F24F 1/027; F24F 5/0017; F24F 5/0021; F24F 2005/0025; F24F 2005/0032
See application file for complete search history.

(56) References Cited

U.S. PATENT DOCUMENTS

| | | | |
|---|---|---|---|
| 7,886,548 B1 * | 2/2011 | Graves | B62B 9/00 62/272 |
| 2006/0288729 A1 * | 12/2006 | Arjomand | F24F 1/027 62/441 |
| 2013/0233002 A1 * | 9/2013 | Donaldson | F24F 5/0021 62/99 |

FOREIGN PATENT DOCUMENTS

WO  WO-2016140598 A2 *  9/2016  ............ F24F 5/0021

* cited by examiner

*Primary Examiner* — Henry T Crenshaw
*Assistant Examiner* — Daniel C Comings
(74) *Attorney, Agent, or Firm* — Long & Chybik; John D. Long

(57) ABSTRACT

A refrigeration device has a condenser coil that has periodic access to outside air. A time-activated thermostat controls the operation of an evaporator coil that is in thermal contact with a reservoir containing phase change material. A thermally conductive pipe containing antifreeze fluid is connected to a pump that circulates the antifreeze fluid inside the pipe. A first portion of the pipe is inside the reservoir in thermal contact with the phase change material and a second portion of the pipe is near an air fan or connected to a fan coil unit to exchange heat through the pipe between the reservoir and the air blown by the fan or the fan coil unit. The evaporator coil produces a phase change in the phase-changing material in the reservoir at night when outdoor temperature is colder than during day and the phase-change material is used during day to cool air blown by the air fan or the fan coil unit. The air fan and a portion of the pipe can be outside of the refrigeration device and be detached.

20 Claims, 11 Drawing Sheets

REFRIGERATION DEVICE USES PHASE CHANGE MATERIAL FOR COOLING AIR

CROSS REFERENCE TO RELATED APPLICATIONS

This invention is an improvement to my U.S. Pat. No. 9,080,801 and my pending patent application Ser. No. 14/728,656 and two U.S. Provisional Patents 62/441,690 dated Jan. 3, 2017 and 62/380,985 dated Aug. 29, 2016.

STATEMENT REGARDING FEDERALLY SPONSORED RESEARCH OR DEVELOPMENT (Not applicable)

REFERENCE TO SEQUENTIAL LISTING, A TABLE, OR A COMPUTER PROGRAM LISTING APPENDIX SUBMITTED ON A COMPACT DISC (Not applicable)

BACKGROUND OF THE INVENTION

1) Field of the Invention

This invention relates generally to the field of refrigerators, freezers, ice makers, window or portable air conditioners and more specifically, it discloses a window, thru-wall or portable refrigeration device for food and/or indoor air.

2) Description of Related Art

According to U.S. Energy Information Administration (EIA) estimates in the Annual Energy Outlook 2017, the electricity consumption by the residential sector in the United States in 2016 was: 18% for space cooling, 7% for refrigeration, 2% for freezers, 9% for space heating and 9% for lighting. Air conditioners use about 6% of all the electricity produced in the United States, at an annual cost of about $29 billion to homeowners. As a result, roughly 117 million metric tons of carbon dioxide are released into the air each year. Furthermore according to EIA's web site, three-quarters of all homes in the United States have air conditioners and 30% of U.S. households have a second refrigerator.

Two of the warmest (and driest) cities in the U.S. are Phoenix Ariz. and Las Vegas Nev. where the highest daily maximum temperatures in June, July and August exceeds 100 F. According to US Climate Data website, the average highest temperatures for July and August in Phoenix is 105° F. (40.55 C) and the lowest is 83° F. (28.33° C.). That is a 22° F. (12.22° C.) temperature difference between average highest and lowest temperatures—primarily based on time of day (highest temperature) or night (lowest temperature).

As the outdoor temperature increases, power consumption increases and energy efficiency (of the refrigeration device) decreases. There are a number of different methods for evaluating air conditioner efficiency. The one that is most closely tied to physical principles is the coefficient of performance, or COP. The COP is the ratio of heat removed from a system to the energy required to remove the heat. The theoretical maximum is equal to the coldest temperature of the refrigerant divided by the difference between its coldest and hottest temperatures, where the temperatures are expressed in Kelvin.

Even the perfect system decreases in efficiency with increased outside temperature, dropping about 2 percent per degree Celsius (about 1 percent per degree Fahrenheit). In the real world, the drop in efficiency is even more dramatic; so it's not an illusion when your air conditioner seems to be working harder as the outside temperature increases. Therefore for Phoenix Ariz. (see 2 paragraphs up) during July & August the energy efficiency drops more than 24.4% operating the air conditioner during night or early morning hours (outdoor temperature ~83° F.) than during day (~105° F. usually around 3 PM). In other words, during July and August in Phoenix, operating a window air conditioner during night is >24% more efficient than during day.

According to FDA web site, the ideal temperature inside a refrigerator compartment is about 40° F. and inside the freezer compartment about 0° F. At temperatures between 0 and 32° F., food deteriorates more rapidly. Also the recommended thermostat setting for an air conditioner is 78 F.

Time programmable thermostats are available at Home Depot include for example Nest thermostat. With Nest thermostat target temperatures can be set on the hour or at 15-minute intervals—like at 7:00, 3:30, or 12:45. A time activated thermostat can control what hours to activate an evaporator for freezing ice (during colder hours, usually before sunrise) and when to deactivate it (for melting ice during warmer hours, usually during afternoon).

A 'Fan Coil Unit' (FCU) is a simple cooling device consisting of a heating or cooling coil and fan. It is part of an HVAC system found in residential, commercial, and industrial buildings.

The pipe is typically made of heat conducting material such as copper or aluminum. It receives hot or cold water and removes heat from or adds heat to the air through heat transfer. FCUs circulate hot or cold liquid or gas through a coil in order to condition a space. The hose, or ideally copper tubing (pipe) is wound around in a spiral at the back or front of the air fan, so the air drawn into or out of the fan is cooled (or heated) to below (or above) the ambient summer (or winter) air temperature. Antifreeze fluid or heavily salted water is often used as the coolant pumped around the system through the coil to prevent freezing. Any circulation pump (like aquatic or fluid pump) can be used to move the coolant around the system through the coil.

Depending upon the selected chilled water temperatures and the relative humidity of the space, it is likely that the cooling coil will dehumidify the entering air stream, and as a by product of this process, it will at times produce a condensate which will need to be carried to drain. The fan coil unit (FCU) will contain a purpose designed drip tray with drain connection for this purpose.

Fan coil units are divided into two types: Two-pipe fan coil units or four pipe fan coil units. Two-pipe fan coil units have one supply and one return pipe. The supply pipe supplies either cold or hot water to the unit depending on the time of year. Four-pipe fan coil units have two supply pipes and two return pipes. This allows either hot or cold water to enter the unit at any given time.

In addition, there are portable air conditioners that have their condenser exposed to outside the desired cooling area or outdoor air through a flexible air duct that is attached to a window (or an opening through the wall) enabling the condenser coil to exchange heat (expel hot air) through the air duct to outside the desired cooling area or outdoor air.

Phase change materials are substances that absorb and release thermal energy during the process of changing phase (for example melting and freezing). When a phase change material freezes, it releases a large amount of energy in the form of latent heat at a relatively constant temperature. Conversely, when such material melts, it absorbs a large amount of heat from the environment. phase change materials recharge as ambient temperatures fluctuate, making them ideal for a variety of everyday applications that require temperature control.

The most commonly used phase change material is water/ice. Ice is an excellent phase change material for maintaining temperatures at 0° C. But water's freezing point is fixed at 0° C. (32° F.), which makes it unsuitable for most thermal energy storage applications.

To address that limitation, phase change materials have been developed for use across a broad range of temperatures, from −40° C. to more than 150° C. They typically store 5 to 14 times more heat per unit volume than materials such as water, masonry or rock. Among various heat storage options, phase change materials are particularly attractive because they offer high-density energy storage and store heat within a narrow temperature range.

BRIEF SUMMARY OF THE INVENTION

This invention is a combined thru-wall, window or portable refrigeration device that uses the temperature difference between day and night to efficiently cool air. It saves electricity by using phase change material such as for example water-ice to solidify the phase change material at night or early morning hours and it lets the phase change material melt during day. Its condenser coil can at least periodically exchange heat with outside the desired cooling area or outdoor air (outside). The refrigeration device may include a refrigerator, a freezer, an icemaker or an indoor air conditioner.

The refrigeration device has one or more thermal conducting pipes (tubes or hoses) made of for example copper or aluminum. One or more water pumps circulate thermal conducting antifreeze fluid inside the pipes. The pipes run between a reservoir that contains thermally conducting phase change material and one or more air fans blowing cold air into indoor space or into a refrigerator, a freezer or an icemaker compartment.

A first portion or section of the pipe meanders (zigzags, twists and turns or coils) in the reservoir to maximize heat exchange with the phase change material inside the reservoir. A second portion of the pipe meanders (zigzags, twists and turns or coils) in front or behind the air fan to intercept the air blown by the air fan and to maximize heat exchange between the pipe and the air blown by the fan. Instead of the second portion of the pipe meandering in front or behind the fan, the second portion can be directly connected to a commercially available fan coil unit for enabling efficient exchange of heat between the reservoir and the air blown by the fan coil unit.

A time activated thermostat controls the operation of an evaporator coil to produce a solidified phase change in the phase-changing material in the reservoir at night or during early morning hours before outdoor temperature rises. As the outdoor temperature rises during day time, the time activated thermostat shuts off the evaporator coil allowing the solidified phase-change material to gradually melt. The cold melting phase change material is used for cooling air during day when outdoor temperature is hot.

The melting phase change material inside the reservoir keeps the pipes cold, enabling cooling of the inside of the refrigerator (freezer or ice maker depending on the temperature of the phase change material) or indoor air with the fan coils without using electricity during warmer day time hours (usually around 3 PM) while the refrigeration cycle (evaporator, condenser, compressor, motor) is off.

An alternative embodiment may include the refrigeration device heating indoor space during winter. For heating indoor space, a separate heat conducting pipe (with heat conducting fluid circulating therein by a fluid pump) runs between a heat source and the fans blowing air indoors (into the home). The pipe transfers heat from the heat source to the same air fans used during summer for cooling indoor space.

This refrigeration device may also be (or sold as) a standalone refrigerator, a standalone freezer, a standalone ice maker, a standalone air conditioner or a combination of all or some of the above. If it's a standalone ice maker, the ice compartment may serve a dual function, as an ice dispenser and as a water/ice reservoir (phase change material reservoir) that is frozen (phase change) during night or early morning hours before temperature rise (to conserve energy). After the temperature rises (in the afternoon, usually around 3 PM), some or all of the ice is melted (phase change) for cooling inside the refrigerator or indoor air.

Furthermore, the refrigerator, freezer, ice box or phase change material reservoir can be positioned in any order. For example the freezer compartment may be at the bottom instead of on top of the refrigeration device. Since the pipe can be extended (made longer) the section of the pipe running between the reservoir and the fans may be insulated to reduce heat loss during heat exchange between the reservoir and the air fans.

Objects and Advantages

Some objects and advantages of the present invention include:

1) Saves indoor space, convenient, compact.

2) Costs less to buy & maintain than a separate refrigerator, freezer, ice maker and air conditioner.

3) Saves electricity by running the motor and compressor (doing most of the work) when outdoor temperature is lower (instead of higher) and there is low demand on electric grid. The energy saving is even more significant in dry climate areas (like southwest US) with significant temperature difference between day (warm) and night or early dawn (cool). Or alternatively the same size motor and compressor can cool a larger cubic feet of indoor space.

4) Can be used all year round as a refrigerator, a freezer or an ice maker.

5) Saves electricity during winter by using outdoor air for cooling inside of the refrigerator.

6) During summer, it shifts electricity consumption from peak to off-peak hours of demand on the electric grid or provides additional cooling power during hot summer days (usually around 3 PM).

7) Like air conditioner, it can dehumidify indoor air and works well in warm humid climate.

8) In winter it can heat indoor air using the same air fans used during summer for cooling indoor air. Thus saving space.

9) A disadvantage of portable air conditioner is that its portability is restricted by an air duct that during operation must be attached to the condenser to expel hot air emitted by condenser coil outside the cooling area (see FIG. 11). In addition portable air conditioners have internal air fans and internal air ducts. A fan pulls warm indoor air into the portable air conditioner and the warm air is cooled by an evaporator coil. The cold air is then blown out of the other end of the air duct.

Applicant's portable air conditioner only at night to sunrise, when outdoor is relatively mild and often air conditioner is not used, is attached to an air duct or directly to a window or an opening through the wall to expel hot air produced by the condenser coil outside the desired cooling area or outdoor. During hot day time hours (usually in the afternoon) when air conditioning is most needed, it can be moved to any location that cooling is needed and used without an air duct connecting the condenser to outside the desired cooling area. That is because the compressor, evaporator and condenser are deactivated. During hot day time when air conditioning is activated only the air fan and the pump run. Furthermore the air fan can be outside the unit and in that case an internal air duct is not needed thereby reducing size, weight, manufacturing, shipping and product cost.

10) Applicant's refrigeration device can cool indoor air without an internal (inside the refrigeration device) air fan or internal air duct. This reduces size, shipping and manufacturing cost. Damp dirty air ducts inside the air conditioner, are hard to clean, may cause allergies and contribute to indoor air pollution. Also unwanted insects may hide and nest inside.

Other objects and advantages will become apparent from the following descriptions, examined in connection with the accompanying drawings, wherein, by way of illustration and example, an embodiment of the present invention is disclosed.

DETAILED DESCRIPTION OF THE INVENTION

Figure 1:
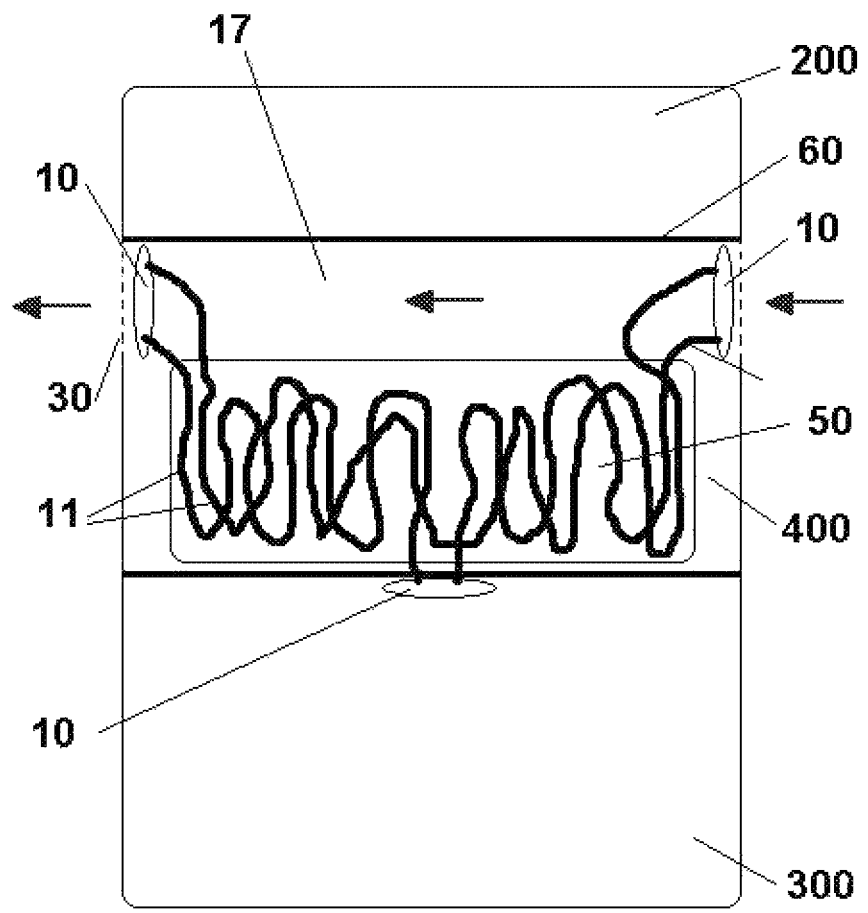
FIG. 1 is a side-view of one embodiment of the present invention containing a freezer, a refrigerator and an air cooler between the freezer and the refrigerator compartments.

FIG. 1 is a side-view of one embodiment with its back (right side of drawing) having access to outside air and its front (left side of drawing) having access to indoor air. On top is the freezer compartment 200, at the bottom, the refrigerator compartment 300 and in between is an air duct 17 and the phase change material reservoir. As shown, the refrigeration device contains a thermally insulated phase change material reservoir 50 and an air duct 17 above it between indoor (left side) and outside air (right side). Two gates (louvers or shutters) 30 open and close access to indoor and/or outside air. The meandering (zigzagging or coiling) pipe in front or behind the air fan 12 forms or creates a fan coil 10. As shown, there are two fan coils 10 at both ends of the air duct.

One fan coil 10 (towards outside, right side) pulls hot outside air into the air duct 17 and the second fan coil 10 (towards indoors, left side) ejects cold air out of the air duct 17 into indoor space. The arrows indicates the direction of air flow generated by the fan coil 10. There is another fan coil 10 inside the refrigerator compartment 300, ejecting cold air into the refrigerator compartment 300. All 3 fan coils 10 may use the same pipe 11 or each using a separate pipe 11. Antifreeze or heavily salted water can be used as the liquid coolant pumped around the system through the pipe 11. Any circulation pump (like aquatic pump, not shown) can be used to move the coolant (antifreeze fluid) around a loop through the pipe 11.

In operation, during summer nights (when outdoor is colder than during day), an evaporator coil (not shown) cools the phase change material reservoir 50 to freeze the phase change material (for example freeze water to ice) inside the reservoir 50, cooling the pipe 11 zigzagging, twisting inside the phase change material reservoir 50. During the day, when the fan coil 10 inside the refrigerator is turned on, the chilled pipe 11 meandering or coiling in front of the air fan 12 (forming a fan coil 10) cools the air blown into the refrigerator compartment 300.

Similarly, during hot summer days, the user will turn on the air cooler. That opens the two gates (louvers or shutters) 30 at both ends of the air duct 17 connecting indoor to outside air and also turns On (activates) the two fan coils 10 at the two ends of the air duct 17. The hot outside air entering the air duct 17 loses some of its heat to the chilled pipe 11 meandering or coiling in front of the air fan 12 (forming a fan coil) and cools the air blown indoors. As shown there is a thick insulation 60 between the freezer 200 (normally at around 0 F) and the air duct 17 to prevent the freezer compartment 200 gaining heat due to its proximity to the air duct 17.

Figure 2:
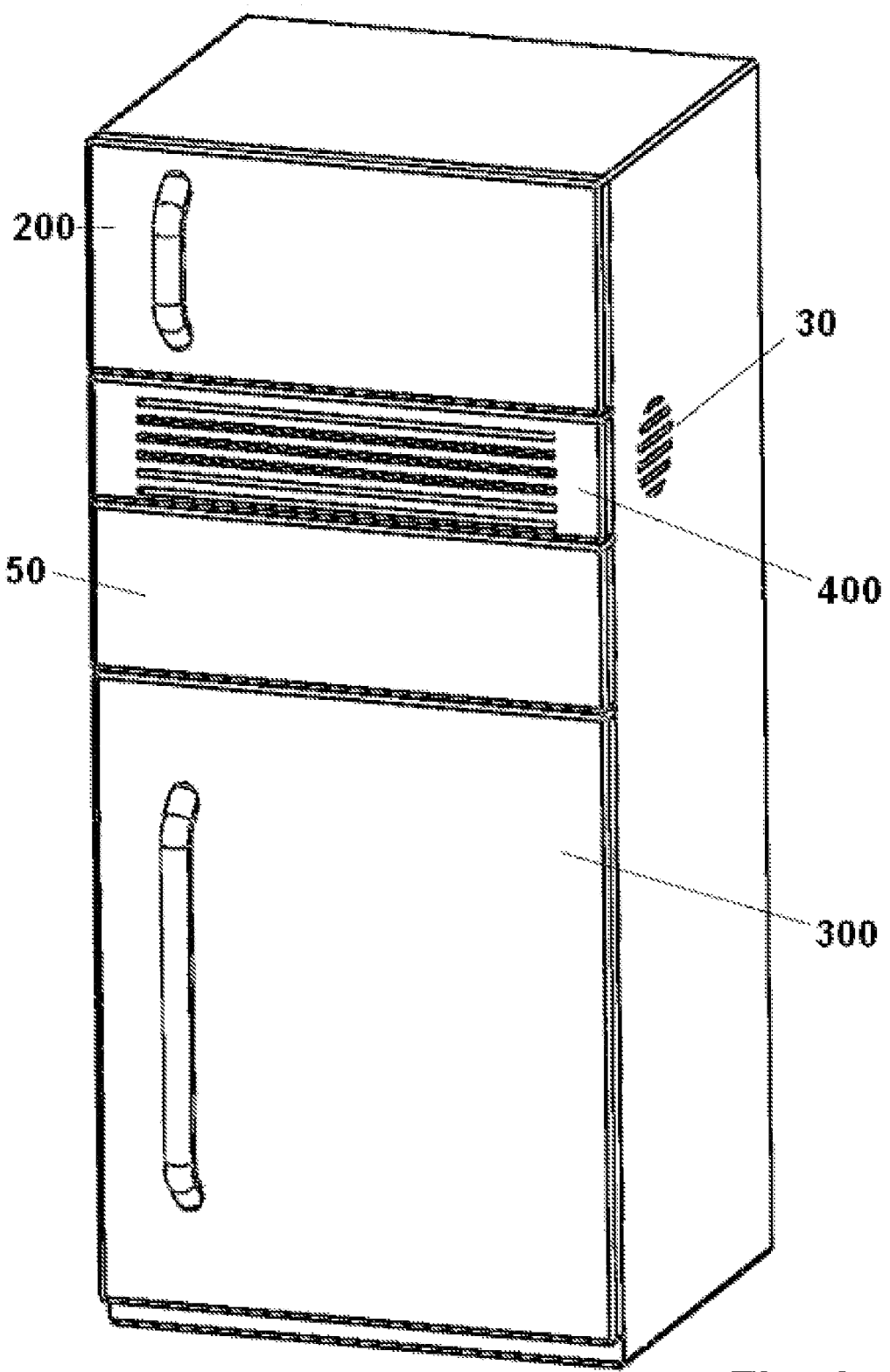
FIG. 2 Is the front view of an embodiment having the air cooler between the freezer and the refrigerator compartment.

FIG. 2 is the front view of an embodiment having the indoor air cooler between the Freezer 200 and the phase change material reservoir 50 above the refrigerator compartment 300.

Figure 3:
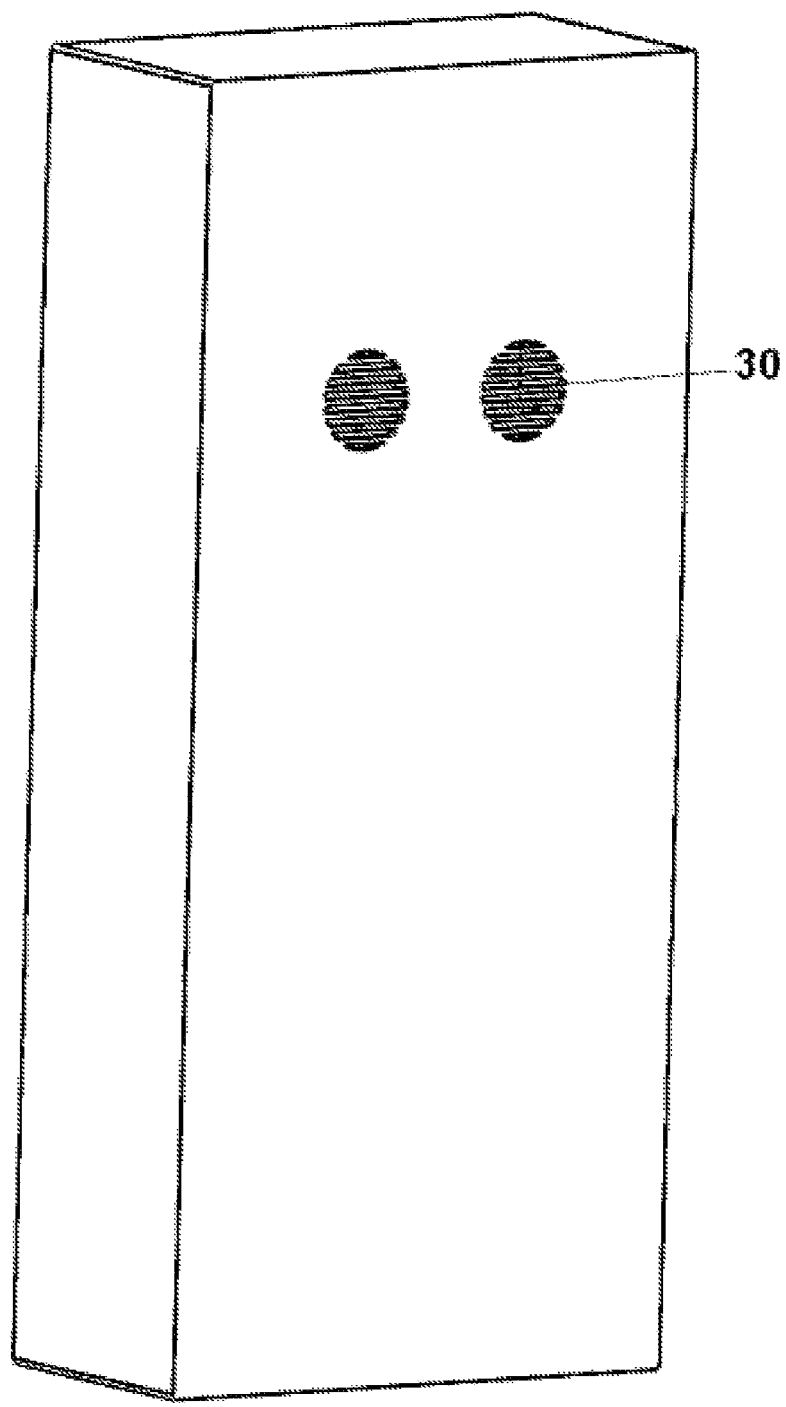
FIG. 3 is the back view of FIG. 2.

FIG. 3 is the back view of FIG. 2. For simplification, the condenser exposed to or having access to outside the desired cooling area or outdoors directly or through an air duct attached to a window is not shown. Depending on the difference between indoor and outside temperature, the refrigeration device can take (pull) air from indoor (sides of the refrigeration device, not shown) or outside if it's back is exposed to outside air directly or through an air duct attached to a window or an opening through the wall. For example, if indoor temperature is 80° F. and outside is 110 F, it is much faster and more energy efficient to take (pull) air from indoor rather than outside for cooling.

Figure 4:
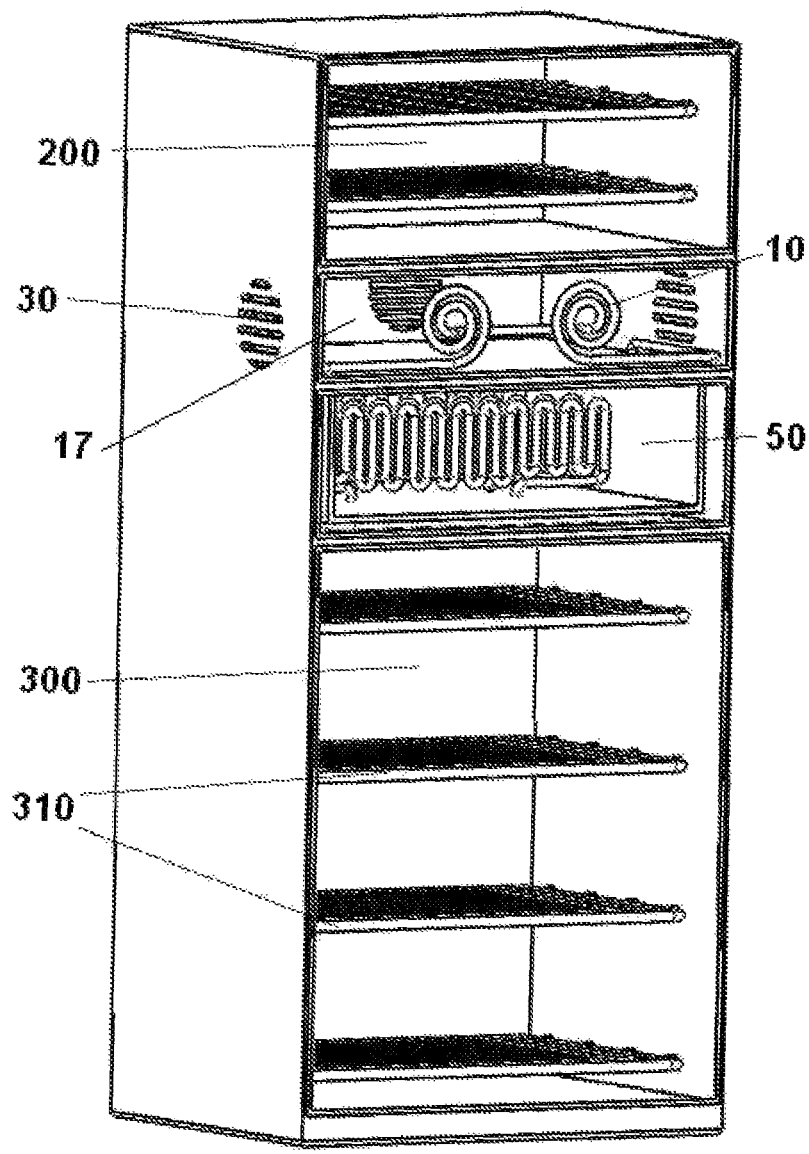
FIG. 4 is the inside view of FIG. 2 without front door and front panel.

FIG. 4 is inside view of FIG. 2 without front doors and front panels. As shown on top is the freezer compartment 200. Under that is the air duct 17 and under that is the phase change material reservoir 50 above the refrigerator compartment 300 with shelves 310 for food placement.

Figure 5:
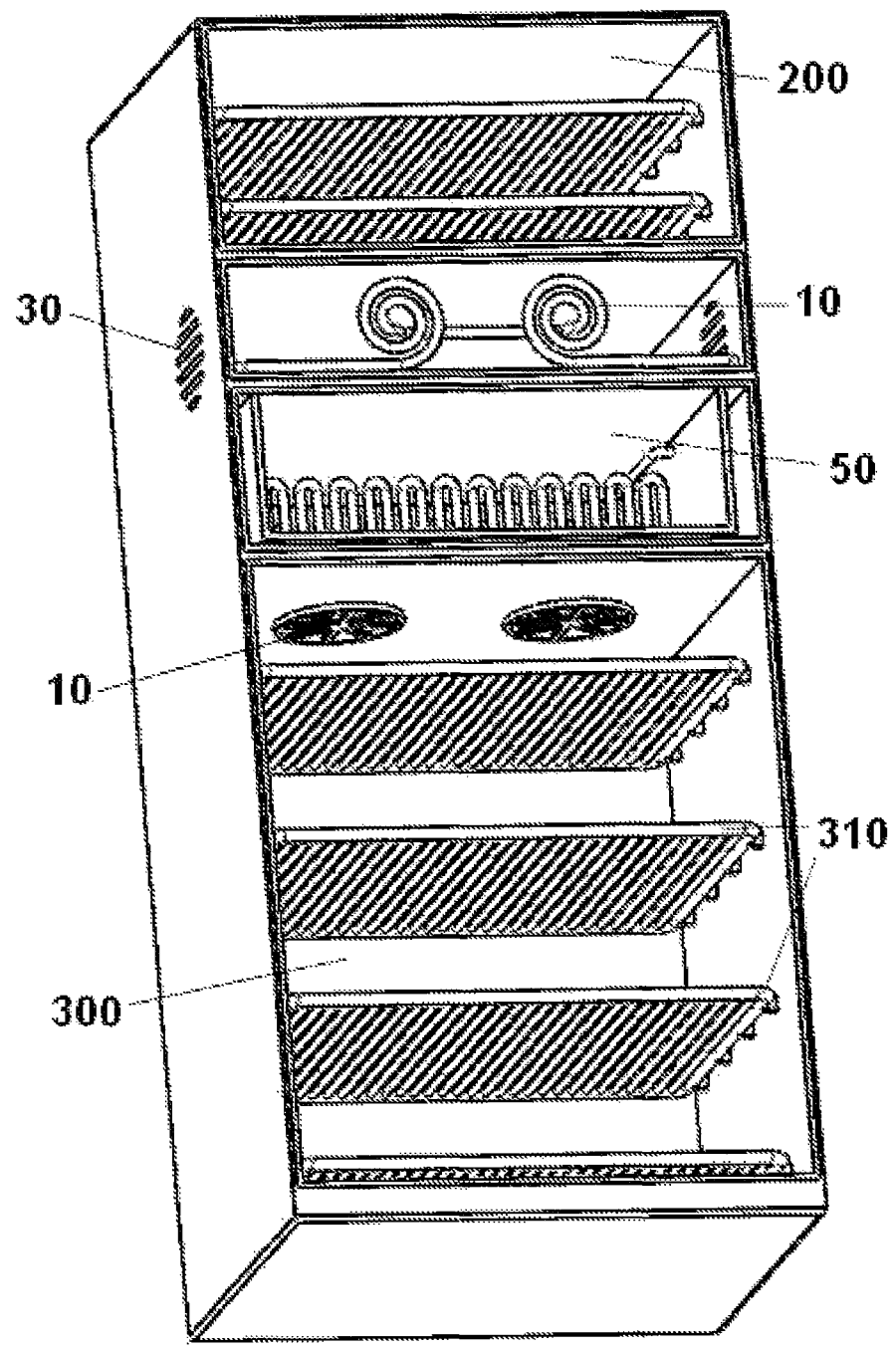
FIG. 5 is an angled view of FIG. 4 showing the refrigerator and air cooling fan coils.

FIG. 5 is an angled view of FIG. 4 showing the refrigerator 300 and air cooler's fan coils 10 blowing cold air into the refrigerator compartment 300. As shown, it has two pipes. One is used for cooling the refrigerator compartment 300 and the other for cooling indoor air. As shown the top two fan coils 10 (front circular view) blow cold air indoors and the bottom 2 fan coils 10 blow cold air into the refrigerator compartment 300.

Figure 6:
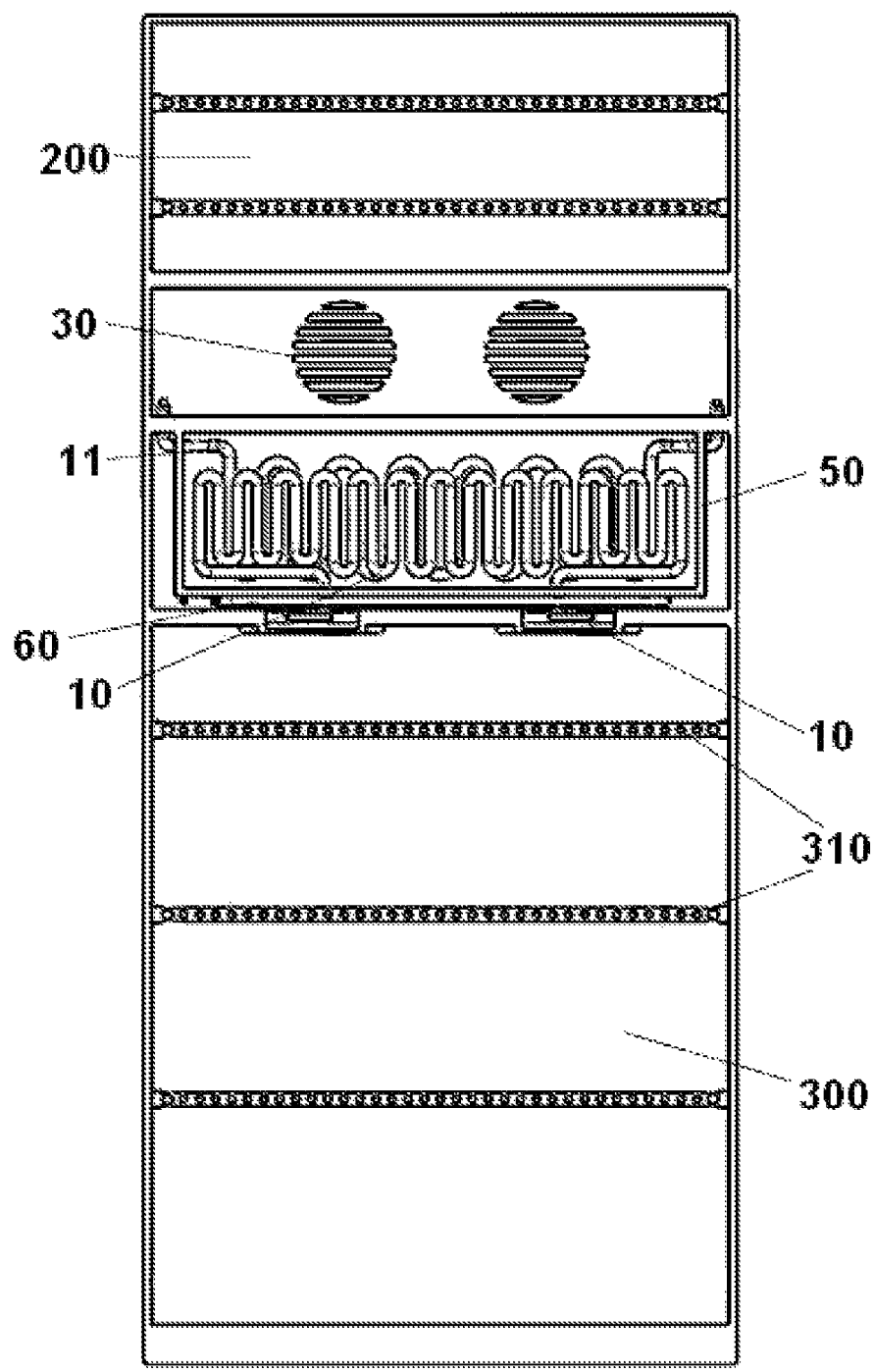
FIG. 6 is front view of FIG. 4 and FIG. 5 showing the inside of the phase change material reservoir.

FIG. 6 is similar to FIG. 5 showing the inside of the phase change material reservoir 50. As shown one or more pipes 11 meander (zigzag twist and turn or coil) inside phase change material reservoir 50 so that the antifreeze liquid circulating inside the pipe 11 lose their heat to the phase change material reservoir 50. An evaporator coil 60 adjacent (shown at the bottom) to the reservoir 50 freezes the phase change material fluid inside the reservoir 50 at night or before sunrise when outdoor temperature is low to save energy. As the temperature rises (usually between 10 AM to 3 PM) the evaporator coil 60 is turned off by a time activated thermostat (not shown) to allow the solidified phase change material inside the reservoir 50 to gradually melt using the thawing for cooling indoor air.

Figure 7:
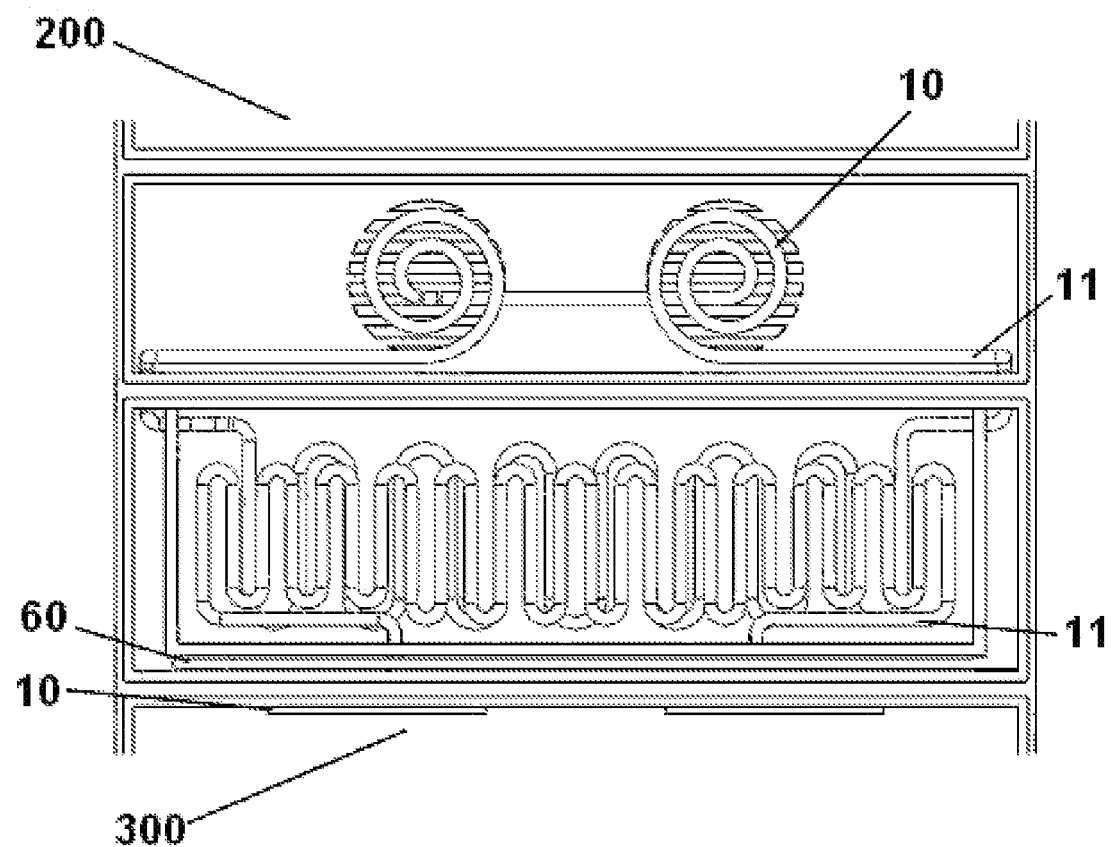
FIG. 7 is magnified view of the inside of the phase change material reservoir of FIG. 6.

FIG. 7 is magnified view of the inside of the phase change material reservoir 50 of FIGS. 5 and 6. In this embodiment there are two independent heat conducting pipes 11. The pipes 11 exchange heat between the phase change material reservoir 50 and the air exiting or blowing out of the fans 12. The pipes 11 meander (zigzag twist and turn or coil) in front or behind the fans 12 (perpendicular to the direction of the air flow) in effect forming a fan coil 10. The pipes 11 also meander inside the phase change material reservoir 50 to exchange their heat with the phase change material inside the reservoir 50. Alternatively the pipe 11 may be connected to a commercially available fan coil unit (instead of forming a coil in front of the fan). The pipes 11 meander inside the reservoir 50 to quickly lose their heat to the phase change material (for example water/ice) reservoir 50 solidified or frozen during night or around sunrise. The two bottom fan coils 10, cool and circulate air (replace warmer with colder air) through the refrigerator compartment 300 (in this embodiment no new air is added to the refrigeration compartment). And the two top fan coils 10 blow cold air indoors.

Figure 8:
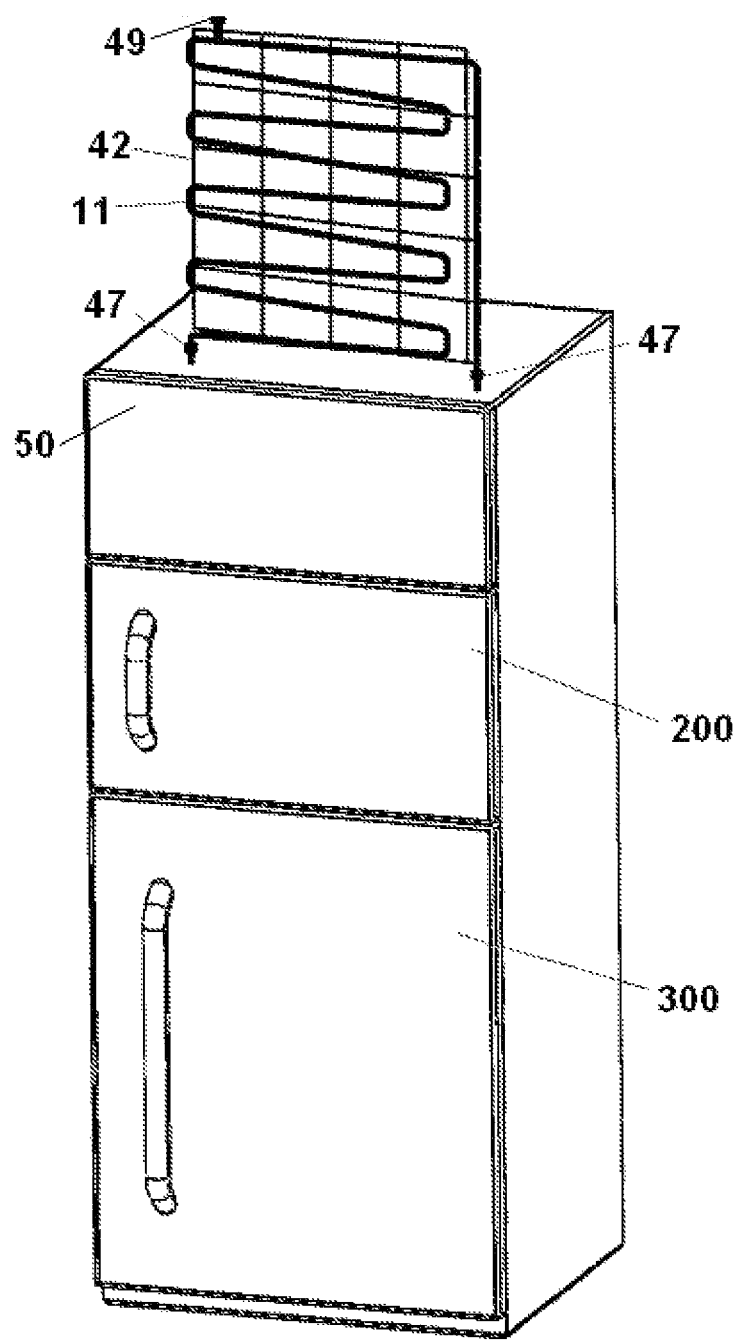
FIG. 8 is a front view of yet another embodiment having the indoor air cooling pipe partially outside and on top of the refrigeration device.

FIG. 8 is a front view of an alternative embodiment of the present invention having the heat conducting pipe 11 partially outside and on top of the refrigeration device above the phase change material reservoir 50. Under the phase change material reservoir is the freezer 200 and under that is the refrigerator 300 compartment. The pipe 11 is attached to and supported by support rod 42. As shown, the pipe 11 meanders (zigzags, twists and turns or coils) in front or behind the fan 12 (perpendicular to the direction of the air flow) in effect forming a fan coil 10. Or alternatively a commercially available fan coil unit may be connected to the two ends of the pipe with a commercially available pipe connector 47. That is so that the meandering pipe (or the fan coil unit) can intercept the air being blown by the air fan. The air fan 12 in front or behind the pipe 11 is not shown.

Optionally a fluid pipe connector 47 may enable the user to disconnect the outside portion of the pipe 11 so that it can be removed during cold seasons when air cooling is not needed. In this case the antifreeze fluid inside the pipe 11 must first be drained. To remove the outside portion of the pipe, the pump circulating antifreeze in the pipe must be turned off. Then the air inlet valve or vent 49 is opened so that the antifreeze can drain into an antifreeze container (not shown) under the pipe. The antifreeze container can be inside the reservoir 50, it can be outside the reservoir 50 or near it. Alternatively, the connector 47 may be hinged (or a small section of the pipe 11 at the connector location made of flexible material such as plastic) to allow the pipe 11 to lay or bend horizontally on top of the refrigeration device when cooling of indoor air is not needed.

Figure 9:
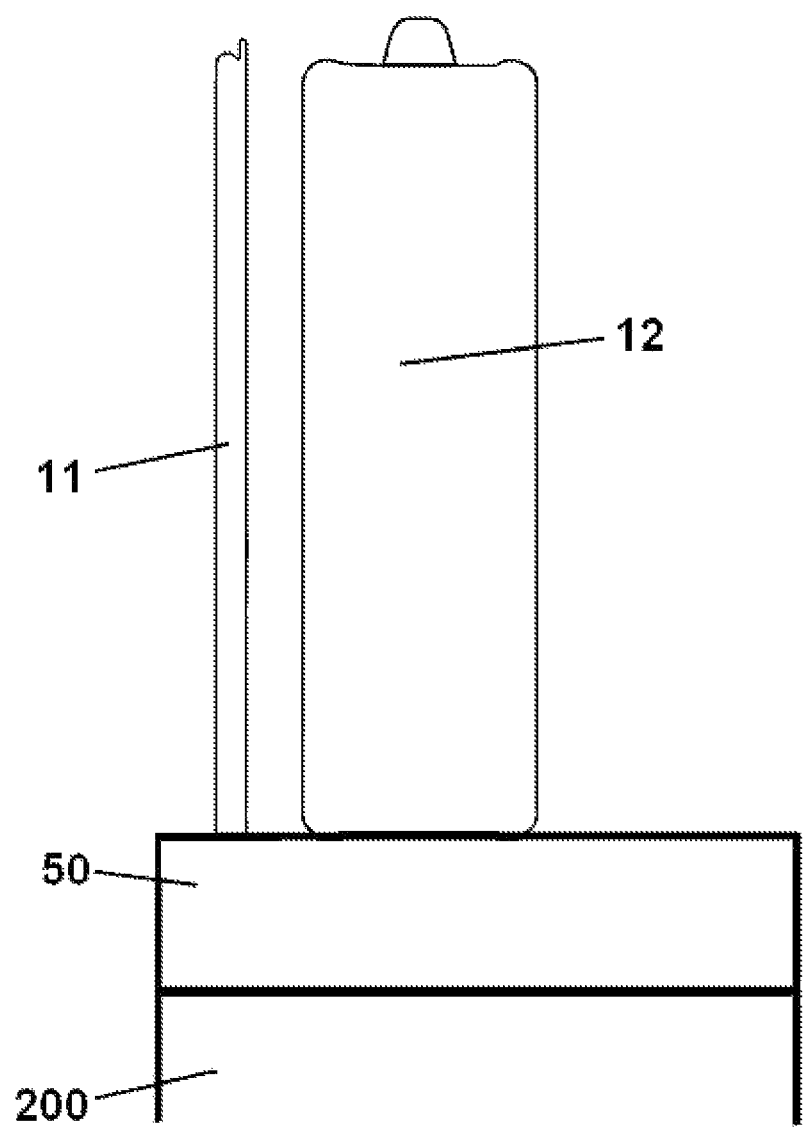
FIG. 9 is a side view of FIG. 8 having an air fan (not shown in FIG. 8) positioned behind the pipe on top of the refrigeration device.

FIG. 9 is the side view of FIG. 8. An air fan 12 is placed behind the pipe 11. The air fan 12 can be an ordinary fan of any size or shape and need not be attached or part of the refrigeration device. During hot days, the user turns the fan 12 on. A fluid circulating pump (not shown) circulates cold antifreeze fluid inside the heat conducting pipe 11. As a result the pipe 11 is cold. The fan 12 blows warm indoor air on the cold pipe 11 meandering (zigzagging, twisting or coiling) in front or behind the air fan 12 perpendicular to the direction of air flow. That is, the pipe can intercept a portion of air being blown by the air fan. Alternatively the outside portion of the pipe is connected to a fan coil unit. The warm often humid indoor air cools as it passes through the cold pipe 11 in front of (or behind) the air fan 12. As the antifreeze fluid inside the pipe 11 reenters the refrigeration device (not shown) it is immersed again in phase change material reservoir 50 frozen at night so that the pipe 11 cools down again as it loops back out of the refrigeration device.

Figure 10:
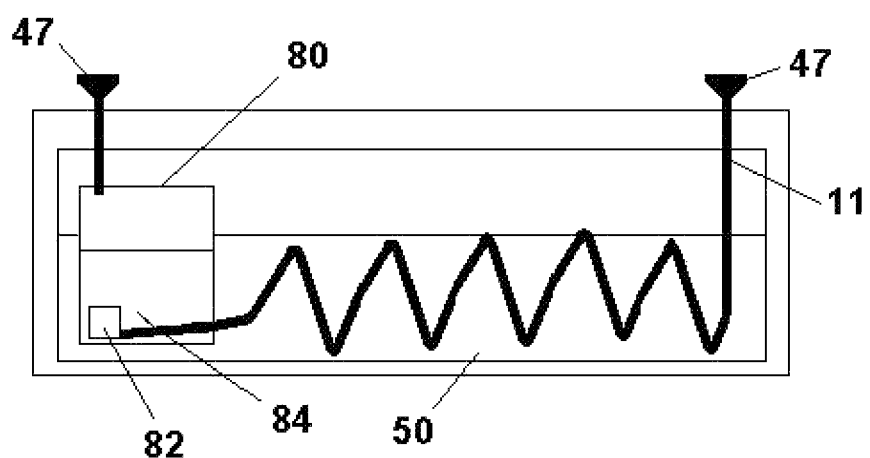
FIG. 10 is a side view of the inside of phase change material reservoir 50 of FIG. 9

FIG. 10 is a side view of the inside of phase change material reservoir 50 of FIG. 9 and FIG. 8. It shows the bottom portion of the pipe 11 inside the refrigeration device. As shown the two fluid pipe connectors 47 stick out of the top of the refrigeration device. The pipe 11 meanders (zigzag, twists or coils) inside the phase change material reservoir 50 to exchange heat with phase change material. The pipe 11 enters an antifreeze container 80 and has a fluid circulating pump 82 attached to it's end. The pump 82 circulates antifreeze fluid 84 into the pipe 11. There is enough empty space in the antifreeze container 80 (not full of antifreeze) to drain all of the antifreeze fluid 84 in the top outer portion of the pipe 11 outside the refrigeration device so that when the top portion of the pipe 11 is disconnected, no antifreeze fluid sips out of the pipe 11.

Figure 11:
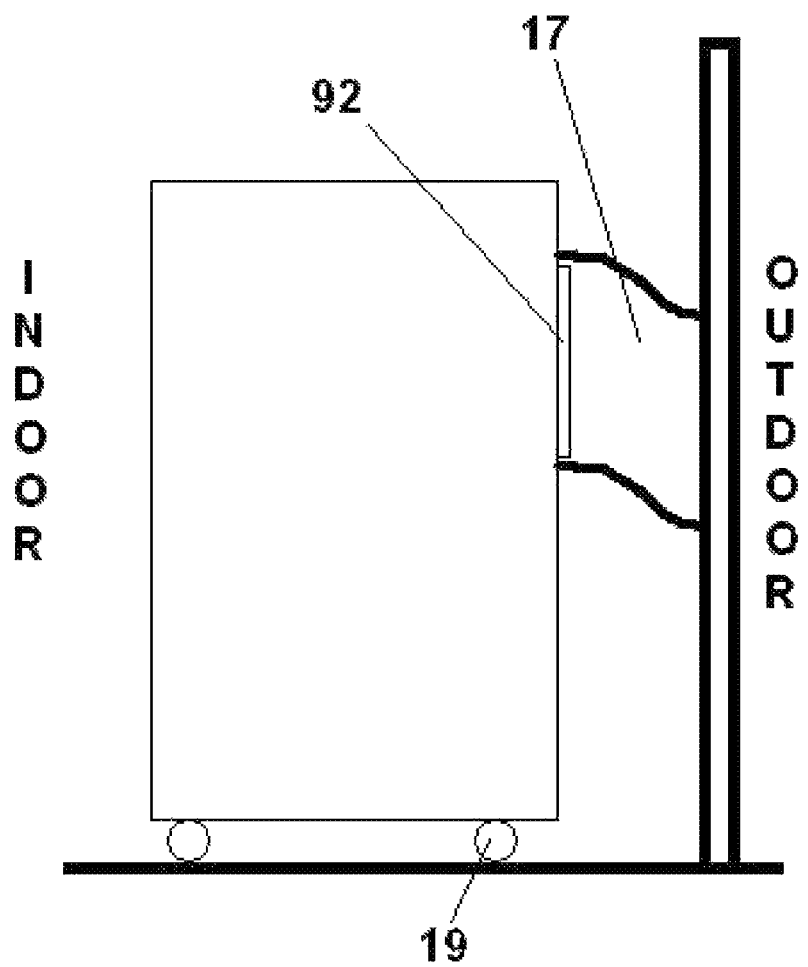
FIG. 11 is a portable version of the refrigeration device that is attached to a hole in the wall or a window through an air duct.

FIG. 11 is a refrigeration device that has wheels 19 and can be moved. It is attached to a hole in the wall or a window through an air duct 17 so that the condenser coil 92 can have access to outside air to expel hot air outside the desired cooling area.

A big disadvantage of portable air conditioners is that their portability is restricted by an air duct 17 that during operation must be attached to the condenser 92 to expel condenser coil's hot air outside. Applicant's portable air conditioner only during night to sunrise (when outdoor is cold and often air conditioner is not used) is attached to an air duct to expel hot air produced by the condenser coil outside.

During hot day time hours (usually in the afternoon) it can be moved (rolled) to any location that cooling is needed and used without an air duct (can run ductless). It can be moved while cooling (the only needed attachment is the electric wire). It can run wirelessly (without electric wire) if the needed power is stored by a battery during night when the portable air conditioner is not used and the phase change material is being solidified.

Most window air conditioners have built-in fans (inside the refrigeration device) which generally have smaller surface area and are weaker than ordinary household air fans. Not having a built-in fan, not only reduces manufacturing cost but also enables the user to buy a separate more powerful air fan or use an existing air fan.

This embodiment of invention also works well with a conventional indoor refrigerator (with the condenser coil exchanging hot air with indoor air rather than outdoor. In this case, the air fan 11 on top of the refrigeration device pulls air from behind the refrigerator where the condenser coil usually is located. As a result air ventilates the fridge's condenser coil, cooling the condenser coil and thereby increasing energy efficiency of the indoor refrigerator.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. A cooling device comprising:
   A a body with a body exterior that defines one or more enclosed hollow body interiors;
   B a condenser coil that has periodic access to an external atmosphere located outside of the body;
   C an evaporator coil that is in thermal contact with a reservoir containing a phase-change material, the reservoir is further contained within one of the one or more enclosed hollow body interiors;
   D a time-activated thermostat that controls the operation of the evaporate and condenser coils as to control when a first phase change occurs in the phase-change material; and
   E a pipe that comprises a second pipe section that removably attached and supported by the body exterior and removably coupled to a first pipe section, the pipe further contains an antifreeze fluid that is circulated through the pipe by a pump to indirectly present the antifreeze fluid in a thermally conductive manner to the phase change material, the movement of antifreeze fluid throughout the pipe initiates a second phase change in the phase-changing material;
   wherein the removal of the second pipe section from the body and from the first pipe section places the cooling device into a compact state for storage or when a cooling of the external atmosphere is not required.

2. The refrigeration device of claim 1 further comprising an air fan removably located upon the body exterior to be held in an upright orientation.

3. The cooling device of claim 1 wherein a part of the second pipe section intercepts air blown by the air fan to allow the part to act as a heat exchanger.

4. The cooling device of claim 1 wherein a part of first pipe section has a meandering configuration within the reservoir.

5. The cooling device of claim 1 wherein the external atmosphere is the atmosphere found outside of a building containing the cooling device.

6. The cooling device of claim 1 wherein the evaporator coil is further contained within the one of the one or more enclosed hollow body interiors.

7. The refrigeration device of claim 6 wherein the one of the one or more enclosed hollow body interiors is a freezer and the phase change material is water.

8. The cooling device of claim 7 wherein a portion of the first pipe section has a meandering configuration and the portion is held within reservoir.

9. The cooling device of 7 wherein the container and pump are held within the reservoir.

10. The cooling device of claim 1 wherein the first pipe section connects to a container, an interior of the container further configured to hold the antifreeze fluid in direct contact with the pump in a manner that allows the pump to move the antifreeze fluid through the pipe.

11. The refrigeration device of claim 1 wherein said antifreeze fluid is only pumped through the pipe when the second pipe section is removably coupled to the first pipe section.

12. The refrigeration device of claim 1 wherein the antifreeze is cooled by the evaporator.

13. The refrigeration device of claim 1 wherein the air fan blows indoor air.

14. The refrigeration device of claim 1 wherein said cooling device is a window air conditioner, a through-wall air conditioner or a portable air conditioner.

15. The refrigeration device of claim 1 wherein the condenser coil connects to an air duct to exchange heat with an external atmosphere, the external atmosphere being found outside of a building containing the cooling device.

16. A method of operating a cooling device comprising the following steps:
   A providing a cooling device comprising a body with a body exterior that defines one or more enclosed hollow body interiors; a condenser coil that has periodic access to an external atmosphere located outside of the body; an evaporator coil that is in thermal contact with a reservoir containing a phase-change material, the reservoir is further contained within one of the one or more enclosed hollow body interiors; a thermostat that controls the operation of the evaporative and condenser coils as to control when a first phase change occurs in the phase-change material; and a pipe that comprises a first pipe section removably coupled to a second pipe section, the pipe further contains an antifreeze fluid that is circulated through the pipe by a pump to indirectly present the antifreeze fluid in a thermally conductive manner to the phase change material, the movement of antifreeze fluid throughout the pipe initiates a second phase change in the phase-changing material; wherein the removal of the first pipe section from the body and from the second pipe section places the cooling device into a compact state for storage or when a cooling of the external atmosphere is not required;
   B presenting the condenser coil to an external atmosphere, the external atmosphere being outside of a building structure containing the cooling device;
   C operating for a period of time the evaporative and condenser coils to initiate a first phase change of the phase change material;
   D coupling together the first pipe section to the second pipe section outside of the period of time;
   E activating the pump when the first pipe section and second pipe sections are coupled together; and
   G providing an atmospheric cooling effect external to the body through second pipe section that results in an initiating of a second phase change in the phase change material.

17. The method of operating a cooling device of claim 16 wherein the first pipe section and second pipe section are uncoupled from one and other during the period of time.

18. The method of operating a cooling device of claim 16 wherein the presenting the condenser coil to an external atmosphere further comprises a step of moving the device body into the external atmosphere found outside of the building structure containing the cooling device.

19. The method of operating a cooling device of claim 16 wherein moving the device body into the external atmosphere found outside of the building structure formerly containing the cooling device is cooler than the external atmosphere found inside of the building structure.

20. The method of operating a cooling device of claim 16 wherein the period of time corresponds to when the external atmosphere found outside of the building structure containing the cooling device is cooler than the external atmosphere found inside of the building structure.

* * * * *